United States Patent Office 2,892,722
Patented June 30, 1959

2,892,722

PROCESS FOR PICKLING CELERY

Theodore Harry Agan, Cleveland, Ohio, assignor to Robert G. Wells, Erie, Pa.

No Drawing. Application February 24, 1953
Serial No. 338,567

1 Claim. (Cl. 99—156)

This invention relates generally to a method of preparing vegetables and more particularly to a process of preserving celery.

It has long been a problem in the preparing of celery to preserve the celery in its crisp condition and its pleasing white appearance during transportation and storage. The common method of shipping celery is in refrigerator cars; however, this method is expensive and after the celery has been taken from the refrigerators and exposed to a warm ambient temperature for awhile, it becomes wilted, discolored, and tough. The larger pieces of celery become stringy and the celery becomes unappetizing. Attempts have been made to find chemicals to spray on the celery to preserve it but these methods have not been satisfactory. Heretofore, no practical method has been devised for the successful preserving of celery. When the celery is cooked, the entire nature and appearance of the celery is changed; therefore, this is not a satisfactory means for preserving celery in its most desirable state. Furthermore, the celery loses its most important vitamins and minerals when cooked.

It is, accordingly, an object of my invention to overcome the above and prior disadvantages in the processing of celery by providing a process for the preserving of celery which requires no cooking.

Another object of my invention is to provide a process for preserving celery which is simple and economical.

Another object of my invention is to provide a novel method of preserving celery which will result in a product which is pleasing in appearance and has a desirable flavor.

Another object of this invention is to provide a novel method of preserving celery whereby the canned vegetable may be stored an indefinite length of time without change in appearance or flavor.

A further object of the invention is to provide a novel method of preserving celery whereby most of the nutritional ingredients will be preserved.

With the above and other objects in view, the present invention consists of the process hereinafter more fully described and more particularly pointed out in the appended claim, it being understood that changes may be made in the minor details thereof without departing from the spirit or sacrificing any of the advantages of the invention.

The first step in preparation of the celery is to provide stalks of the vegetable and clean them thoroughly, cutting off the ends and the green leaves thereof. Cold water is run over the stalks to remove all dirt particles tending to cling thereto. After the stalks are thoroughly clean, they are cut into a convenient size in order to be placed in jars. I preferably cut the stalks into standard lengths of about three to four inches. A sharp instrument is used to cut the stalks in order to avoid the problem of dealing with shreds of the celery adhering thereto.

I provide a solution of salt and vinegar made up of ten ounces of vinegar and four ounces of salt to three quarts of water. I then add hot peppers, garlic, and spices according to the following examples which include the above ingredients and are added depending on the nature of the final product desired.

I 2 ounces salt
Garlic
½ ounce total:
    Mustard
    Coriander
    Allspice
    Ginger
    Cinnamon
    Chillies
    Cloves
    Black pepper
    Bay leaves
    White pepper
    Mace
3 hot peppers
10 ounces vinegar (dry wine)

II 4 ounces salt
Garlic
½ ounce total:
    Mustard
    Coriander
    Allspice
    Ginger
    Cinnamon
    Chillies
    Cloves
    Black pepper
    Bay leaves
    White pepper
    Mace
10 ounces vinegar (dry wine)

III
*Kosher*

4 ounces salt
½ ounce total:
    Mustard
    Coriander
    Allspice
    Ginger
    Cinnamon
    Chillies
    Cloves
    Black pepper
    Bay leaves
    White pepper
    Mace
10 ounces vinegar (wine)

The peppers and garlic are usually placed in the jars in one piece although they may be cut up, if desired.

The celery is put into the solution and allowed to stand for at least eight weeks. After this length of time, the celery may be eaten or stored away for future consumption. It can be stored in a refrigerator or in any other comparatively cool place or left in the solution.

Tough celery pieces become tender and crisp after exposure to my process and the celery maintains its natural white color. It will be apparent that I have provided a novel method of preparing and preserving celery which does not involve a long and complicated procedure as it is only necessary to clean and cut the celery, prepare the solution, and place the celery therein.

Various changes in the process and the specific method described may be made without departing from the spirit and scope of the invention as defined by the appended claim.

What I claim is:

A method of preserving celery in a firm and solid condition for an extended period of time comprising cutting off the ends and leaves of the celery, washing the celery in cold water, cutting the stalks of the celery into lengths from three to four inches, providing a solution comprising approximately the proportions of four ounces of salt, minor portions of garlic, mustard, coriander, allspice, ginger, cinnamon, chillies, cloves, black pepper, bay leaves, white pepper, and mace, providing approximately three hot peppers, approximately ten ounces of dry wine vinegar, and approximately three quarts of water, placing the lengths of celery in the said solution, and allowing said celery pieces to stand in said solution for more than eight weeks.

References Cited in the file of this patent
UNITED STATES PATENTS

| | | |
|---|---|---|
| 1,898,123 | Jones | Nov. 29, 1932 |
| 2,322,880 | Pollak | June 29, 1943 |
| 2,444,875 | Hayes | July 6, 1948 |

OTHER REFERENCES

"The Boston Cooking-School Cook Book," 1945, by F. M. Farmer, publ. by Garden City Publishing Co. Inc., Garden City, New York, p. 739, article entitled "Spiced Celery."